US006937139B2

(12) United States Patent
Nuesser et al.

(10) Patent No.: US 6,937,139 B2
(45) Date of Patent: Aug. 30, 2005

(54) METHOD AND DEVICE FOR CONTROLLING BLOCKAGE OF A PARKING SPACE FOR A VEHICLE

(75) Inventors: Rene Nuesser, Kaarst (DE); Marcus Benthin, Hildesheim (DE); Rodolfo Mann Pelz, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 10/070,403

(22) PCT Filed: Jul. 5, 2001

(86) PCT No.: PCT/DE01/02415

§ 371 (c)(1),
(2), (4) Date: Mar. 5, 2002

(87) PCT Pub. No.: WO02/02892

PCT Pub. Date: Jan. 10, 2002

(65) Prior Publication Data

US 2002/0135461 A1 Sep. 26, 2002

(30) Foreign Application Priority Data

Jul. 6, 2000 (DE) ........................................ 100 32 916

(51) Int. Cl.[7] ................................................ H04Q 9/00

(52) U.S. Cl. .................. 340/5.7; 340/932.2; 340/539.1; 340/3.1; 340/5.1; 340/5.21; 340/5.54; 340/5.61; 340/5.71

(58) Field of Search .......................... 340/932.2, 539.1, 340/540, 3.1, 5.1, 5.2, 5.21, 5.22, 5.23, 5.24, 5.25, 5.26, 5.27, 5.51, 5.54, 5.6, 5.61, 5.62, 5.7, 5.71, 10.1

(56) References Cited

U.S. PATENT DOCUMENTS

| | | | | | |
|---|---|---|---|---|---|
| 4,888,575 | A | | 12/1989 | De Vaulx | |
| 4,894,654 | A | * | 1/1990 | Serenbetz | 340/932.2 |
| 4,931,789 | A | * | 6/1990 | Pinnow | 340/5.64 |
| 5,077,831 | A | | 12/1991 | Weber | |
| 5,184,132 | A | | 2/1993 | Baird | |
| 5,248,215 | A | * | 9/1993 | Fladung | 404/6 |
| 5,252,960 | A | | 10/1993 | Duhame | |
| 5,288,164 | A | * | 2/1994 | Nasatka | 404/10 |
| 5,711,110 | A | * | 1/1998 | Williams | 49/35 |
| 5,751,224 | A | | 5/1998 | Fitzgibbon | |
| RE36,703 | E | * | 5/2000 | Heitschel et al. | 700/90 |
| 6,408,232 | B1 | * | 6/2002 | Cannon et al. | 701/29 |

FOREIGN PATENT DOCUMENTS

| | | |
|---|---|---|
| DE | 198 27 692 | 12/1999 |
| EP | 0 268 902 | 6/1988 |
| EP | 0 950 784 | 10/1999 |
| JP | 01-146071 | 6/1989 |
| JP | 05-258140 | 10/1993 |

* cited by examiner

*Primary Examiner*—Daryl C. Pope
(74) *Attorney, Agent, or Firm*—Kenyon & Kenyon

(57) ABSTRACT

A method and a device, respectively, for controlling a barricade of a parking space for a vehicle are proposed, the method being used to change a code as needed with which authorization for controlling the barricade of the parking space is attained and to recognize a plurality of codes as authorized for one barricade. A code is able to be changed using a password. The radio signals are preferably transmitted via Bluetooth. A dwell time of the vehicle in the parking space may also be logged. A code may be designed as a personal identification number or as an identification number of the vehicle or of the radio module. The barricade is designed as either a garage door or a barrier.

14 Claims, 2 Drawing Sheets

METHOD AND DEVICE FOR CONTROLLING BLOCKAGE OF A PARKING SPACE FOR A VEHICLE

FIELD OF THE INVENTION

The present invention starts out from a method and a device, respectively, for controlling a barricade of a parking space for a vehicle according to the species defined in the independent claims.

BACKGROUND INFORMATION

It is already known to use a remote control that emits radio signals to open and close a barricade, i.e., a garage door or a barrier. In this context, the remote control has an address that makes possible a clear code. Furthermore, it is possible in the case of parking garages or other garages to control a barrier or a garage door using a magnetic card of a switch or a key.

SUMMARY OF THE INVENTION

In contrast, the method of the present invention and the device of the present invention, respectively, for controlling a barricade of a parking space for a vehicle, having the features of the independent claims have the advantage that the changeable code renders it possible to authorize or deny different persons access to control the barricade. In this context, it is then possible as a result of the feature that a plurality of codes are detected as being authorized for one barricade to individually monitor the access of persons. This is of particular interest for parking garages, multi-car garages, business premises, and other restricted areas. Moreover, it is advantageous that a radio signal transmitter already in the vehicle is also able to be used for transmitting the code. In this context, it is necessary for the code to be transmitted by a device in the vehicle to the radio module, so that the radio module uses radio signals to transmit the code to the device of the present invention.

Advantageous improvements of the method and device, respectively, for controlling a barricade of a parking space for a vehicle recited in the independent claims are rendered possible by the measures and further refinements recited in the dependent claims.

It is particularly advantageous that a code is only able to be changed by using a password. As a result, it is ensured that it is more difficult to manipulate the authorized codes, since the password must also be known. Accordingly creating the password makes it possible to achieve a high degree of security.

It is also advantageous that the radio module in the device of the present invention and the one in the vehicle are designed as Bluetooth devices. Bluetooth is a widely used standard for short-range radio transmissions, in which context it can be assumed that some vehicles already have such a Bluetooth radio module for other applications, so that transmitting the code represents an additional use of the Bluetooth radio module. Other such applications are, for example, coupling a laptop or a personal digital assistant.

Moreover, it is advantageous that the dwell time in the parking space is also logged, so that interfacing via a calculation system and/or a monitoring system is possible. Via the used code, it is possible to identify the vehicle and/or the person driving the vehicle.

Furthermore, it is advantageous that the code is designed as a PIN (personal identification number) or as an identification number that is characteristic of the used radio module or of the processor connected thereto. Whether the PIN is to be used for a person-dependent code or the identification number for a vehicle-dependent or device-dependent code determines which design is to be used.

It is also advantageous that, depending on the use, the barricade is designed as a garage door or as a barrier.

Finally, it is also advantageous that a vehicle has a radio module, preferably a Bluetooth device or a remote control, to communicate with the device of the present invention.

DETAILED DESCRIPTION

In parking areas, whether private garages or parking garages, the security of the vehicles and persons therein is to be ensured in order to prevent theft or other crimes. In this context, it is crucial that access authorization to these parking spaces be individual and difficult to manipulate. In accordance with the present invention, a method and a device, respectively, for controlling a barricade of a parking space for a vehicle are, therefore, used, a code that is used as access authorization being changed as needed and a plurality of codes being recognized as authorized for one barricade. In this context, a code is able to be changed using a password, and the radio signals are transmitted according to Bluetooth or another radio transmission method. Furthermore, a dwell time of the vehicle in the park space is also logged. The code is used either as a personal identification number or as an identification number of a vehicle or of the used radio module (or of the processor connected thereto).

Figure 1:
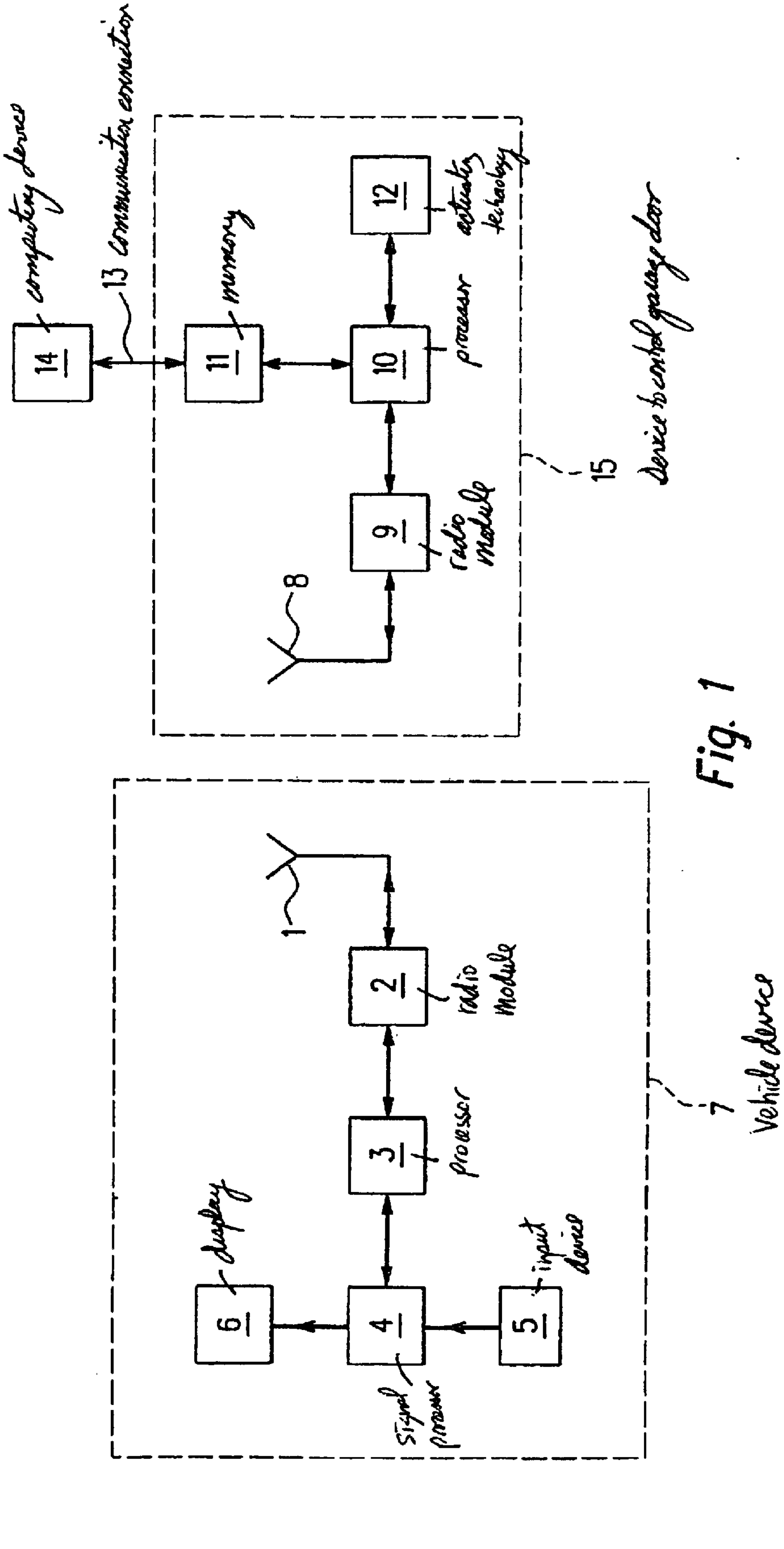
FIG. 1 shows a block diagram of the device of the present invention and the corresponding devices in the vehicles.

FIG. 1 shows the device of the present invention and the corresponding device in a vehicle as a block diagram. An antenna 1 is connected to an input/output of a radio module 2. A processor 3 is connected to a data input/output of radio module 2. A signal processing 4 is connected to a data input/output of processor 3. A display 6 is connected to a data output of signal processing 4. Signal processing 4 is connected via a data input to an input device 5. Antenna 1, radio module 2, processor 3, signal processing 4, input device 5, and display 6 are the components of vehicle device 7. Vehicle device 7 is located in a vehicle that wants to control, i.e., open or close, a barricade, a garage door in this instance.

An antenna 8 is connected via an input/output to a radio module 9. A processor 10 is connected to a data input/output of radio module 9. A memory 11 is connected to a second data input/output of processor 10. Actuating technology 12 is connected to a third data input/output of processor 10. A communication connection 13 is connected to a second data input/output of memory 11. Communication connection 13 connects memory 11 to a computing device 14. Antenna 8, radio module 9, processor 10, memory 11, and actuating technology 12 are the components of device 15 of the present invention, which controls the garage door.

In this instance, radio module 2 is designed as a Bluetooth radio module Bluetooth is an open standard for transmitting radio signals across very short distances. Alternatively, it is possible to use a mobile radio device, i.e., GSM (global system for mobile communications), UMTS (universal mobile telecommunication system), or other radio transmission systems that are preferably already in the vehicle for other purposes. A Bluetooth radio module can be intended, for example, for coupling a computing device to a multimedia network in the vehicle Processor 3 processes the received radio signals and prepares the radio signals to be sent for radio module 2 A code, e.g. a personal identification number or the password when the code is to be changed, is input via input device 5, which is designed as a keyboard, touchscreen, or as a voice input. Signal processing 4 processes the signals coming from input device 5 to then transmit them to processor 3. Furthermore, the inputs are also displayed on display 6, so that a user is informed of his/her inputs. In this instance, display 6 is a plasma screen that is already provided by a navigational device or a car radio. If a fixed code is used that is transmitted to device 15 of the present invention, processor 3 loads a code from a memory after an input at input device 5 and transmits it to radio module 2, which transmits the code via antenna 1 to device 15 of the present invention. Moreover, it is conceivable for an identification number permanently stored in radio module 2 to be used as the code, e.g. a Bluetooth device address.

Via antenna 8, device 15 of the present invention receives the signals sent by vehicle device 7. Radio module 9 filters, amplifies, and converts these radio signals into an intermediate frequency in order to then digitalize them. The digital signals are then transmitted to processor 10, which uses authorized codes stored in memory 11 to check whether the code transmitted by vehicle device 7 is authorized to control the barricade.

If that is the case, actuator technology 12 is activated by processor 10 to open the garage door in this instance. Via computing device 14, which is connected via communication connection 13 to memory 11, it is possible to add to and/or delete the codes in memory 11.

In this context, computing device 14 is located in a main station, e.g. in an administration office of a parking garage, to assign the corresponding, authorized codes. Communication line 13 is designed as a wire-bound line, a modem being connected to each end of the line to transmit or receive the transmitted data. Alternatively, it is possible to configure communication connection 13 as a radio connection, each end of communication connection 13 having a transmitting-receiving station which transmits and receives radio signals. It is also possible to design communication connection 13 as a combination of line connection and radio connection.

If a user in a vehicle wishes to change his/her code using his/her password, the user indicates via input device 5 that he/she desires a change. This change request is transmitted to device 15 of the present invention, which consequently transmits the request for the password to be input to vehicle device 7. This password is input via input device 5 and is then transmitted to the device of the present invention. Device 15 of the present invention uses processor 10 to check whether the password is correct. The password is compared to passwords stored in memory 11, and a check is made to determine whether this password corresponds. If this is the case, device 15 of the present invention informs vehicle device 7 that it is possible to change the code. In this instance, the code is a personal identification number. The user in the vehicle is prompted to use input device 5 to input the new code and the old code to be tested. These codes are then transmitted to device 15 of the present invention, which saves the new code as authorized and deletes the old code from memory 11. If this occurs, device 15 of the present invention transmits a confirmation to vehicle device 7 that the new code is now valid. However, using computing device 14, it is also possible to add different codes to the already authorized codes in memory 11. Depending on the desired security standard, this can be performed in a password-protected manner or also in a non-password-protected manner.

Figure 2:
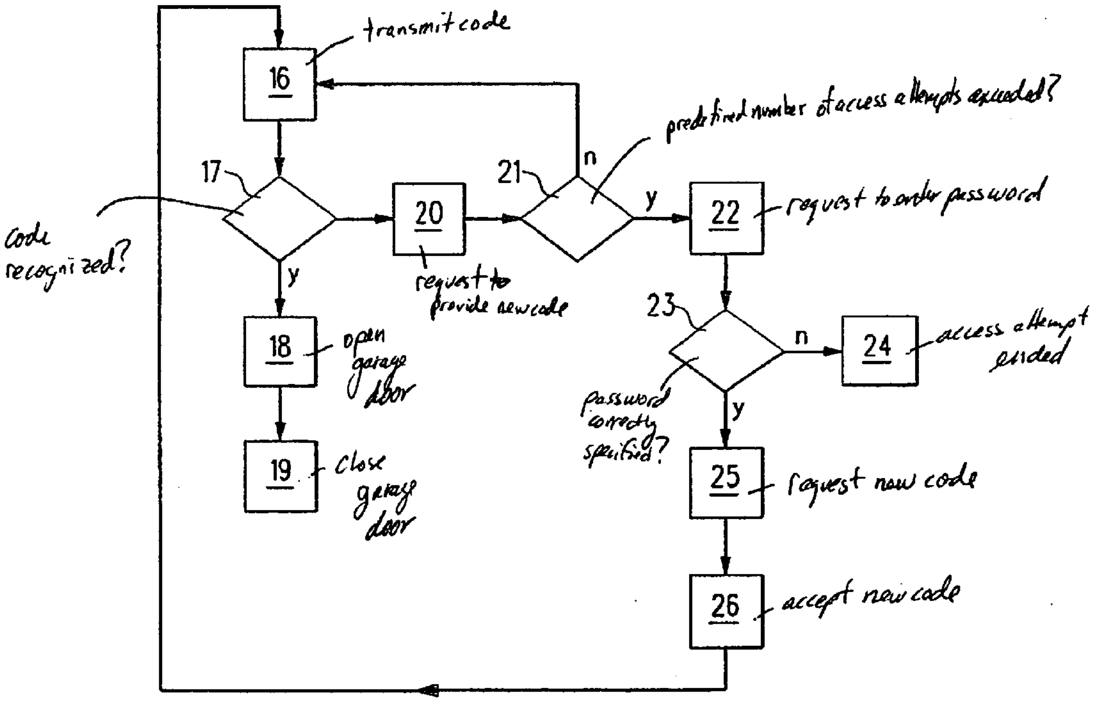
FIG. 2 shows the method of the present invention as a flow chart.

In FIG. 2, the method according to the present invention is represented as a flow chart. In method step 16, vehicle device 7 transmits a code to device 15 of the present invention in order to open the barricade (the garage door). In method step, 17, device 15 of the present invention checks via processor 10 and memory 11, whether the code is recognized as authorized. If this is the case, the garage door is opened in method step 18 via actuating technology 12, i.e., an electromotor having a connected mechanism. For this purpose, processor 10 transmits appropriate commands to actuating technology 12. In method step 19, the garage door is closed either after a predefined time or after the code is sent again via vehicle device 7 It is also possible that a sensor detects the barricade being passed and it is subsequently automatically closed.

At the same time, processor 10 transmits via memory 11 and communication line 13 to computing device 14 that the vehicle having the respective code is now located in the parking space, so that the dwell time in the parking space may also be logged and then later potentially used for a calculation. This is of particular interest for hotels or public parking garages. However, security issues also play a role here If it is detected in method step 17 that the code transmitted by vehicle device 7 is not authorized, device 15 of the present invention transmits a request in method step 20 to vehicle device 7 to provide a new code. In method step 21, a check is made to determine whether the vehicle already performed a predefined number of authorization attempts. If this is not the case, the new code is transmitted in method step 16. However, if the vehicle has already exceeded the predefined number of access attempts at the device of the present invention, device 15 of the present invention transmits a request for the password to be entered to vehicle device 7 in method step 22. In method step 23, processor 10 and memory 11 check whether the password transmitted by vehicle device 7 is authorized. If a password is not transmitted after a predefined time, this also qualifies as unauthorized. If this is detected as unauthorized in method step 23, the access attempt is ended in method step 24 and this may be transmitted to computing device 14 so that an alarm is able to be triggered if applicable. However, if it is determined in method step 23 that the password is correctly specified, device 15 of the present invention transmits the request in method step 25 to vehicle device 7 to input a new code, and this new code is accepted as authorized in method step 26. In method step 16, this code is then transmitted to device 15 of the present invention so that the garage door is able to be opened using this code.

The device of the present invention may also be combined with video monitoring in order to be able to record, for example, the vehicle identifier or the persons in the vehicle.

What is claimed is:

1. A method for controlling a barricade of a parking space for a vehicle, the method comprising the steps of:

controlling the barricade from the vehicle by a code transmitted using a radio signal, checking the code with regard to an authorization of the code, wherein the code is changed by an input, and a plurality of codes are recognized as authorized for one barricade; and logging a dwell time of the vehicle in the parking space.

2. The method according to claim 1, wherein:

the code is changeable using a password.

3. The method according to claim 1, wherein:

the radio signal is transmitted in accordance with Bluetooth.

4. The method according to claim 1, wherein:

the code includes one of a personal identification number, an identification number of the vehicle, and an identification number of a radio module.

5. The method according to claim 1, wherein the code is only changeable using a password.

6. A device for controlling a barricade of a parking space for a vehicle, comprising:

a radio module;

a processor;

a memory storing a plurality of authorized codes; and an actuating technology for controlling the barricade, wherein:

the device is controllable using an authorized code that is receivable from the radio module, each of the plurality of authorized codes is changeable using the processor, the device is connectable to a computing arrangement, wherein the plurality of authorized codes in the memory are changeable using the computing arrangement, and the computing arrangement logs a dwell time of the vehicle in the parking space.

7. The device according to claim 6, wherein:

the plurality of authorized codes in the memory are changeable using a password.

8. The device according to claim 6, wherein:

the radio module includes a Bluetooth module.

9. The device according to claim 6, wherein:

the barricade includes one of a garage door and a barrier.

10. The device of claim 6, wherein the code is only changeable using a password.

11. A vehicle comprising:

a device that includes:

a radio module, a processor connected to the radio module, a signal processing element connected to the processor, a display connected to the signal processing element, and an input device connected to the signal processing element for receiving a code, wherein:

the code is transmittable to a device for controlling a barricade of a parking space for a vehicle and for logging a dwell time of the vehicle in the parking space.

12. The vehicle according to claim 11, wherein the radio module includes a Bluetooth module.

13. The vehicle according to claim 11, wherein:

the device is formed as a remote control.

14. The vehicle of claim 11, wherein the code is only changeable using a password.

* * * * *